No. 758,390. PATENTED APR. 26, 1904.
O. SELG.
FILTER.
APPLICATION FILED SEPT. 11, 1903.
NO MODEL.
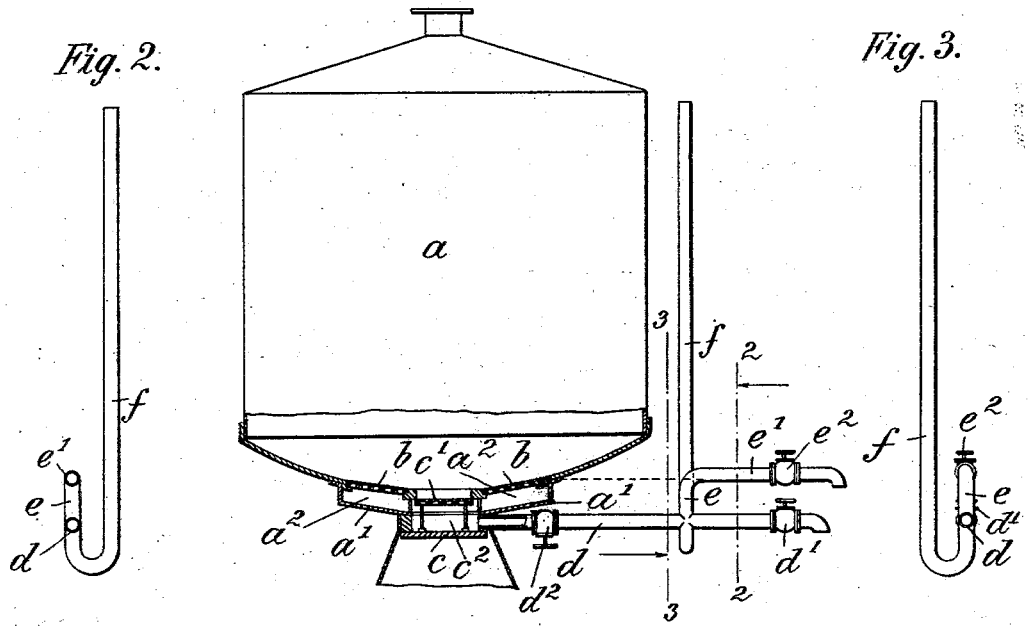
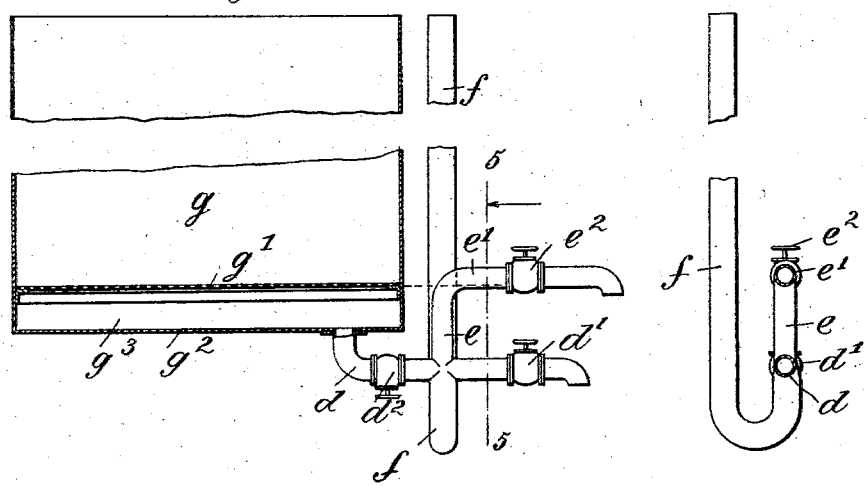
Witnesses:
Arthur Jumper
William Schulz
Inventor:
Otto Selg
by Frank S. Busser Att'y No. 758,390. Patented April 26, 1904.

UNITED STATES PATENT OFFICE.

OTTO SELG, OF NEW YORK, N. Y.

FILTER.

SPECIFICATION forming part of Letters Patent No. 758,390, dated April 26, 1904.

Application filed September 11, 1903. Serial No. 172,736. (No model.)

*To all whom it may concern:*

Be it known that I, OTTO SELG, a citizen of the United States, residing at New York city, Brooklyn, county of Kings, and State of New York, have invented new and useful Improvements in Filters, of which the following is a specification.

This invention relates to a filter which is so constructed that the strainer is not apt to become clogged and that a free percolation of the liquid is always insured.

In the accompanying drawings, Figure 1 is a side elevation, partly in section, of a mash-tub embodying my invention; Fig. 2, a section on line 2 2, Fig. 1; Fig. 3, a section on line 3 3, Fig. 1; Fig. 4, a vertical section of a modification of the mash-tub; and Fig. 5, a section on line 5 5, Fig. 4.

The letter $a$ represents the body or shell of a filter, such as a mash-tub, having a curved strainer $b$ above its curved bottom $a'$, so as to form an intervening filtering-chamber $a^2$. A central opening in the strainer $b$ and bottom $a'$ for the discharge of the spent grain may be closed by a gate-valve $c$, having strainer $c'$. Between the valve $c$ and its strainer $c'$ there is formed a filtering-chamber $c^3$, that communicates with chamber $a^2$ and extends below the same. The discharge-pipe $d$, having cocks $d'$ and $d^2$, enters the chamber $c^2$ directly below the bottom of chamber $a^2$, so that the filtrate may flow from chamber $a^2$ into chamber $c^2$ and thence out through pipe $d$. With the construction thus far described a suction is apt to be created in the filtering-chamber $a^2$, which will pack the grain tightly upon the strainer $b$, and thus prevent the efficient operation of the apparatus. In other words, as the grain gradually settles on the strainer $b$ the discharge through pipe $d$ diminishes, and when the filtrate will no longer run sufficiently quick to fill the same a suction will be created in the pipe, and consequently in the chamber $a^2$, beneath the strainer $b$. This suction will draw the grain into the meshes of the filter, and thus pack or clog the same. To overcome this objection, I connect the pipe $d$ between its inlet and discharge ends with a U-shaped trap or pipe having two legs $e$ $f$, of unequal length. The short leg $e$ extends first upward to a level flush with or slightly above the level of chamber $a^2$ and is then bent sidewise to form a second or upper discharge-pipe $e'$, having cock $e^2$. The long leg $f$ extends vertically a suitable distance along the side of shell $a$ and constitutes a stand-pipe.

In drawing off the filtrate the pipe $f$ is filled with water, the cock $d^2$ is opened, the cock $d'$ is closed, and the cock $e^2$ is opened. The filtrate will thus flow from the pipe $d$ up through the leg $e$ and out through pipe $e'$. As the leg $e$ must always be completely filled before the filtrate can be discharged and as the level in chamber $a^2$ corresponds to that of leg $e$, it follows that the chamber $a^2$ must always remain filled. Consequently if the grain should settle upon the strainer the flow of the liquid through the pipe $e'$ would be gradually diminished, but no suction would be created in chamber $a^2$, so that the grain is not drawn against and into the meshes of the strainer.

The liquid-level in the stand-pipe $f$ will of course correspond to that of the liquid-level in vessel $a$. Consequently the pressure in the vessel $a$ will be counterbalanced by that in pipe $f$, and the grain will not be apt to be packed against the strainer by the top pressure. Thus by the joint action of the upper discharge-pipe and the stand-pipe any packing of the filtering material against the strainer either by suction or pressure is avoided, and a free percolation is at all times insured.

After the level of the liquid in vessel $a$ has sunk to the level of the strainer $b$ the cock $e^2$ is closed and the cock $d'$ is opened, so that the filtering-chamber $a^2$ may empty.

In Figs. 4 and 5 the strainer $g'$ is horizontal and is separated from the horizontal bottom $g^2$ of the vessel $g$ by the intervening filtering-chamber $g^3$. The construction is otherwise the same as above described.

Although I have shown and described the invention as applied to a mash-tub, it is evident that it is equally applicable to other vessels constituting filters.

What I claim is—

A filter provided with a strainer, a filtering-chamber below the same, a discharge-pipe communicating with the bottom of said chamber, a U-shaped trap communicating with the discharge-pipe and having two legs of unequal length, one of said legs constituting a standpipe, and the second leg extending first upward and then sidewise to form a second discharge-pipe, substantially as specified.

Signed by me at New York city, (Manhattan,) New York, this 10th day of September, 1903.

OTTO SELG.

Witnesses:
WILLIAM SCHULZ,
FRANK V. BRIESEN.